(12) United States Patent
Hikosaka et al.

(10) Patent No.: US 11,428,881 B2
(45) Date of Patent: Aug. 30, 2022

(54) OPTICAL CONNECTOR AND OPTICAL CONNECTOR DEVICE

(71) Applicant: YAZAKI CORPORATION, Tokyo (JP)

(72) Inventors: Tomohiro Hikosaka, Makinohara (JP); Motonori Miyanari, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 15 days.

(21) Appl. No.: 17/133,528

(22) Filed: Dec. 23, 2020

(65) Prior Publication Data

US 2021/0191055 A1 Jun. 24, 2021

(30) Foreign Application Priority Data

Dec. 24, 2019 (JP) .............................. JP2019-232925

(51) Int. Cl.
*G02B 6/42* (2006.01)

(52) U.S. Cl.
CPC ......... *G02B 6/4246* (2013.01); *G02B 6/4204* (2013.01); *G02B 6/4244* (2013.01); *G02B 6/4256* (2013.01); *G02B 6/4292* (2013.01); *G02B 6/4245* (2013.01)

(58) Field of Classification Search
CPC ...... G02B 6/42; G02B 6/4214; G02B 6/4298; G02B 6/4204; G02B 6/424; G02B 6/4244–4256; G02B 6/4292; H01L 25/0753; H01L 27/15; H01L 33/44; H01L 33/46; H01L 33/486; H01L 33/58; H01L 33/60

USPC ........................................................... 385/33
See application file for complete search history.

(56) References Cited

U.S. PATENT DOCUMENTS

| 4,625,333 | A | * | 11/1986 | Takezawa | G02B 6/4206 |
| | | | | | 398/139 |
| 6,491,443 | B1 | * | 12/2002 | Serizawa | G02B 6/4292 |
| | | | | | 385/33 |
| 2001/0000316 | A1 | * | 4/2001 | Kawai | G02B 6/4266 |
| | | | | | 385/33 |
| 2009/0039377 | A1 | * | 2/2009 | Horio | G02B 6/4272 |
| | | | | | 438/22 |
| 2019/0312172 | A1 | | 10/2019 | Hikosaka et al. | |

(Continued)

FOREIGN PATENT DOCUMENTS

| CN | 110346879 A | 10/2019 |
| CN | 112444925 A | 3/2021 |

(Continued)

*Primary Examiner* — Michael P Mooney
(74) *Attorney, Agent, or Firm* — Kenealy Vaidya LLP

(57) ABSTRACT

An optical connector includes a housing in which a counterpart optical connector connected to a pair of optical fibers having a first optical fiber and a second optical fiber is fitted, a light emitting side lens portion accommodated in the housing, and in which a first end surface of the first optical fiber in the counterpart optical connector is disposed on one end side, a light receiving side lens portion accommodated in the housing, and in which a second end surface of the second optical fiber in the counterpart optical connector is disposed on one end side, a light emitting element disposed on the other end side of the light emitting side lens portion, and a light receiving element disposed on the other end side of the light receiving side lens portion.

4 Claims, 7 Drawing Sheets

(56) References Cited

U.S. PATENT DOCUMENTS

2020/0218003 A1    7/2020   Hikosaka
2021/0063654 A1    3/2021   Hikosaka

FOREIGN PATENT DOCUMENTS

| | | |
|---|---|---|
| EP | 3 786 678 A1 | 3/2021 |
| JP | S59-77402 A | 5/1984 |
| JP | 2003-227970 A | 8/2003 |
| JP | 2012-247622 A | 12/2012 |
| JP | 2013-228435 A | 11/2013 |
| JP | 2019-56895 A | 4/2019 |
| WO | 2010/143175 A1 | 12/2010 |

* cited by examiner

OPTICAL CONNECTOR AND OPTICAL CONNECTOR DEVICE

CROSS REFERENCE TO RELATED APPLICATIONS

This application claims priority from Japanese Patent Application No. 2019-232925 filed on Dec. 24, 2019, the entire contents of which are incorporated herein by reference.

BACKGROUND OF THE INVENTION

Field of the Invention

The present invention relates to an optical connector and an optical connector device.

Description of Related Art

An optical connector used in an optical communication field includes a fiber optic transceiver (FOT), which is an optical conversion module including a light emitting element and a light receiving element, and lenses disposed to face the light emitting element and the light receiving element of the FOT (for example, see Patent Literature 1: JP-A-2012-247622). In the optical connector, in a state that a counterpart optical connector is joined, an optical signal from the light emitting element of the FOT is guided to an optical fiber of the counterpart optical connector through a lens, and an optical signal from the optical fiber of the counterpart optical connector is guided to the light receiving element through a lens.

[Patent Literature 1] JP-A-2012-247622
[Patent Literature 2] JP-A-2019-56895

SUMMARY

According to one or more embodiments, an optical connector includes a housing in which a counterpart optical connector connected to a pair of optical fibers having a first optical fiber and a second optical fiber is fitted, a light emitting side lens portion accommodated in the housing, and in which a first end surface of the first optical fiber in the counterpart optical connector is disposed on one end side, a light receiving side lens portion accommodated in the housing, and in which a second end surface of the second optical fiber in the counterpart optical connector is disposed on one end side, a light emitting element disposed on the other end side of the light emitting side lens portion, and a light receiving element disposed on the other end side of the light receiving side lens portion. In a state that the counterpart optical connector is fitted to the housing, a distance between the light receiving side lens portion and the second end surface of the optical fiber is smaller than a distance between the light emitting side lens portion and the first end surface of the optical fiber.

BRIEF DESCRIPTION OF THE DRAWINGS

FIG. 4A is a perspective view from a front side. FIG. 4B is a perspective view from a rear side.

DETAILED DESCRIPTION

Hereinafter, an embodiment will be described with reference to the drawings.

Figure 1:
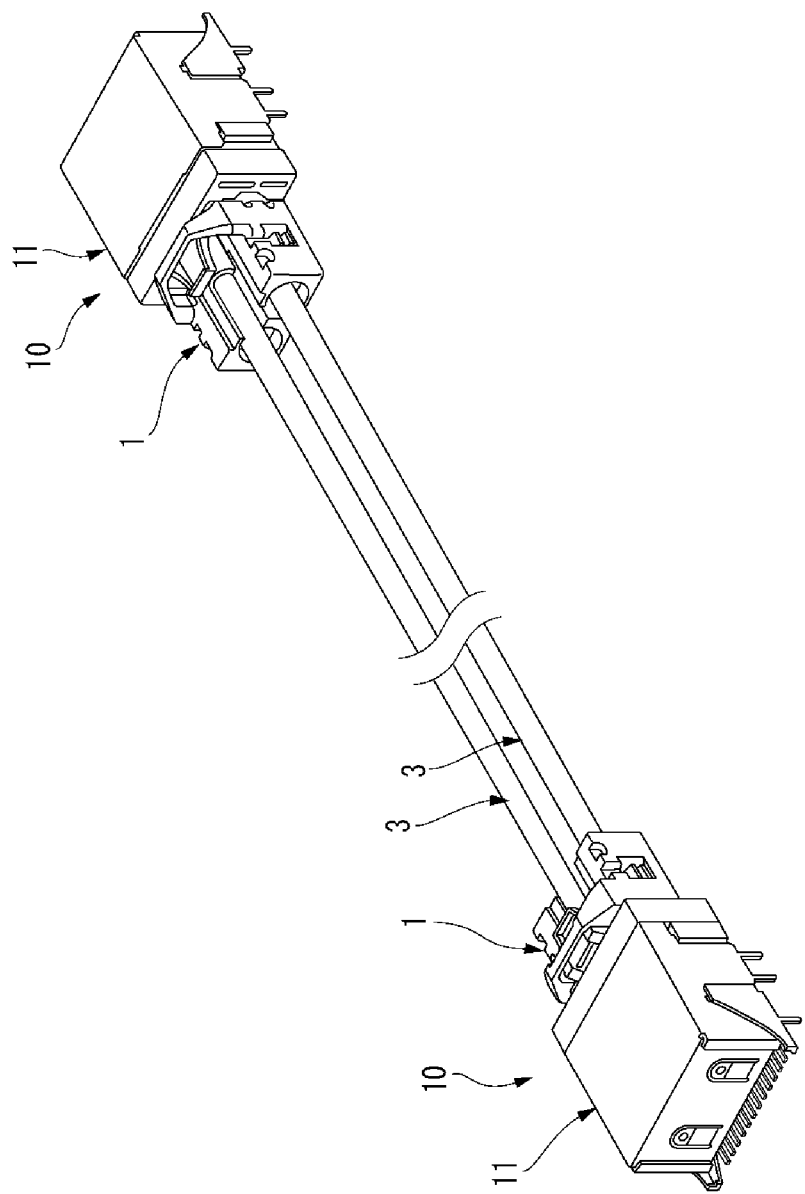
FIG. 1 is a perspective view of an optical connector device including an optical connector and a counterpart optical connector.

FIG. 1 is a perspective view of an optical connector device 10 including an optical connector 11 and a counterpart optical connector 1 according to the embodiment.

As shown in FIG. 1, the optical connector 11 according to the present embodiment is a receptacle type optical connector, and is mounted on a printed circuit board (not shown). The counterpart optical connector 1, which is a plug connector, is joined to the optical connector 11. Accordingly, the optical connector device 10 is implemented by the optical connector 11 and the counterpart optical connector 1.

Figure 2:
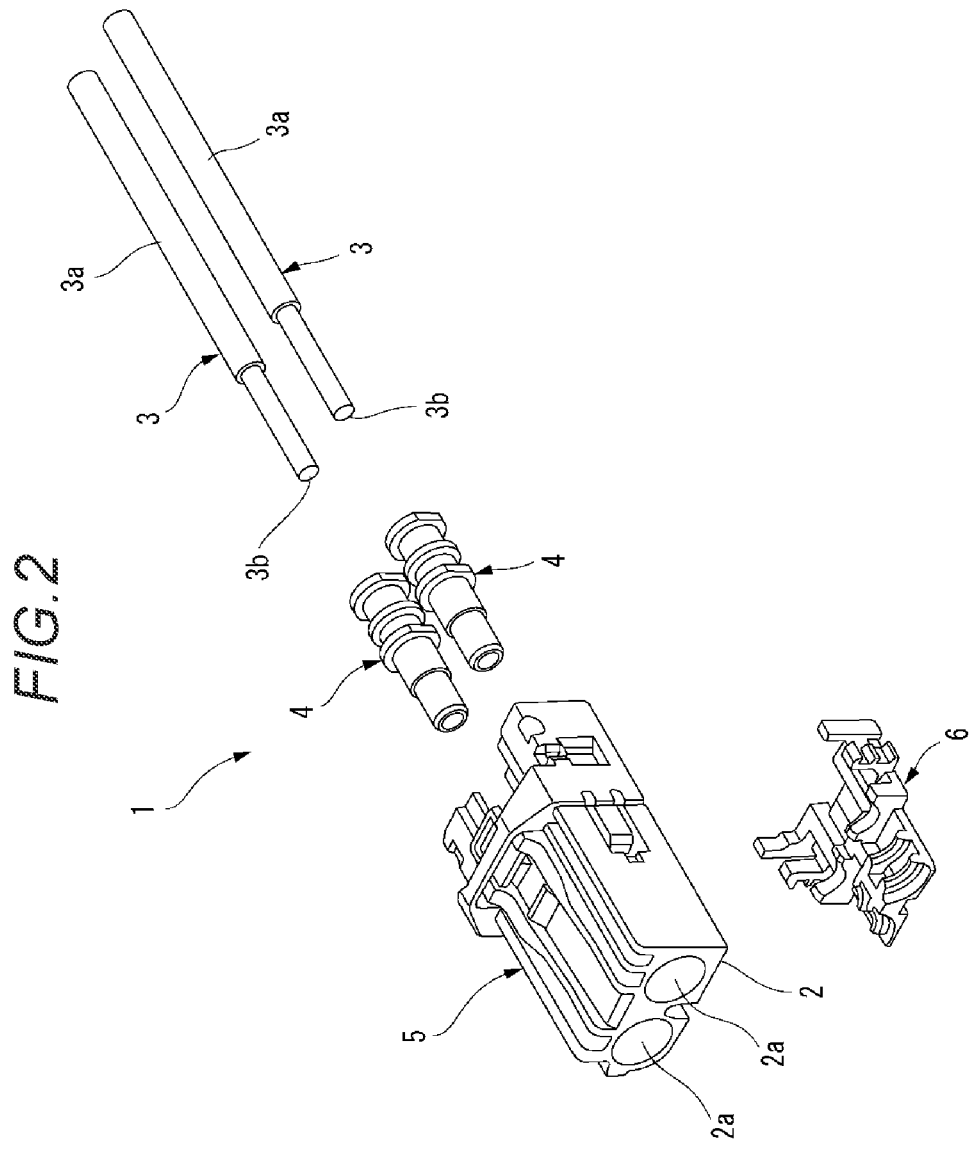
FIG. 2 is an exploded perspective view of the counterpart optical connector.

FIG. 2 is an exploded perspective view of the counterpart optical connector 1.

As shown in FIG. 2, the counterpart optical connector 1 includes a pair of optical fibers 3, ferrules 4 to be assembled to end portions of the optical fibers 3, a housing 5 connected to the end portions of the optical fibers 3 to which the ferrules 4 are assembled, and a holder 6 that holds the ferrules 4 in the housing 5. An outer periphery of the optical fiber 3 is covered by an outer sheath 3a, and the optical fiber 3 is exposed from the outer sheath 3a at an end portion to which the ferrule 4 is assembled. A tip end of the housing 5 is a fitting portion 2, and the fitting portion 2 is fitted to the optical connector 11. Accordingly, the optical connector 11 and the optical fiber 3 of the counterpart optical connector 1 can be brought into optical communication.

Figure 3:
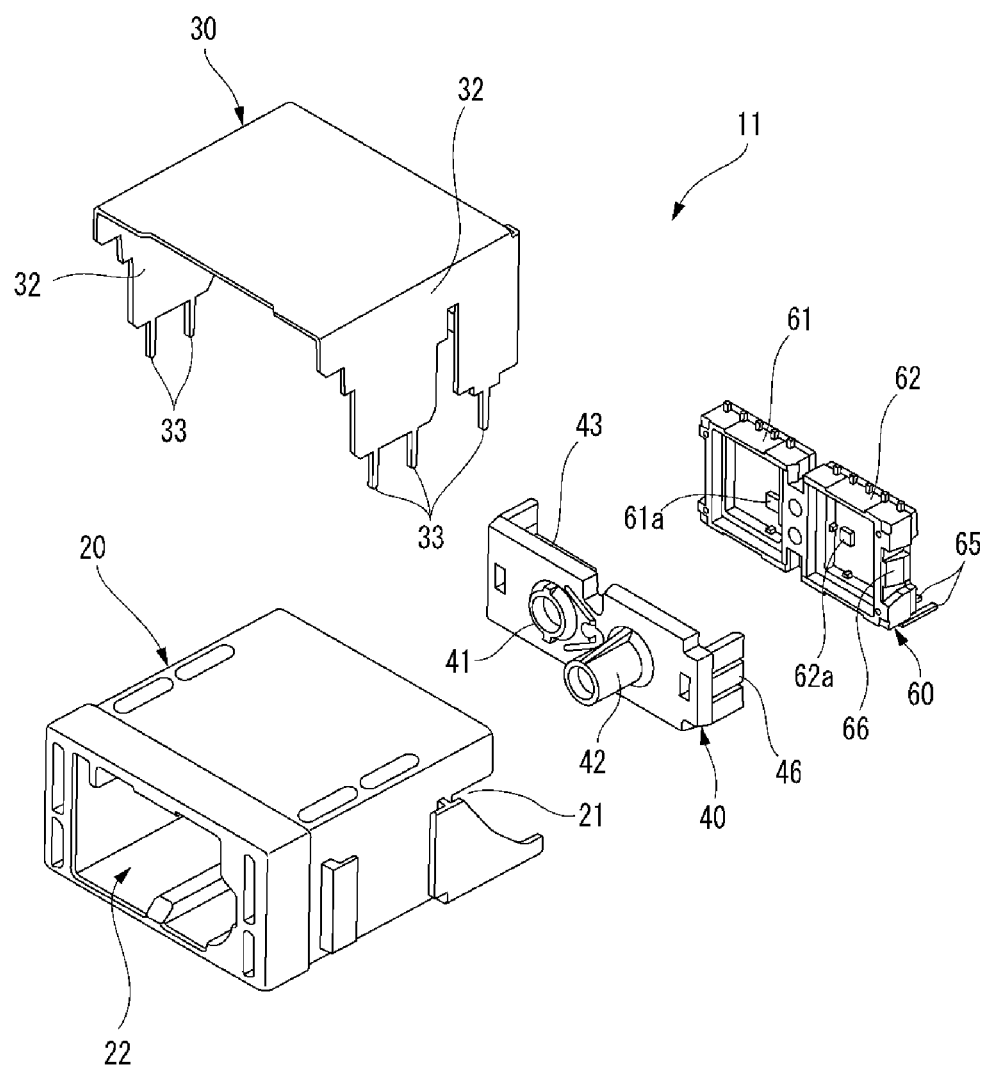
FIG. 3 is an exploded perspective view of the optical connector.

FIG. 3 is an exploded perspective view of the optical connector 11 according to the present embodiment.

As shown in FIG. 3, the optical connector 11 includes a housing 20, a shield case 30, a lens body 40, and a fiber optic transceiver (FOT) 60 which is an optical conversion module.

The housing 20 is a box-shaped member molded with a synthetic resin, and a fitting recess 22 into which the fitting portion 2 of the counterpart optical connector 1 is fitted is formed on a front end side of the housing 20. The housing 20 has an optical module accommodating portion 21 on a rear end side, and an optical module integrated by assembling the lens body 40 and the FOT 60 in advance is assembled to the optical module accommodating portion 21. The shield case 30 is fitted into the housing 20 from an upper portion and mounted.

The shield case 30 is formed into a box shape by pressing a conductive metal plate or the like. The shield case 30 is mounted to the housing 20 so as to cover and shield the upper portion, both side portions, and a rear portion of the housing 20. By mounting the shield case 30 to the housing 20, the lens body 40 and the FOT 60 as the optical module assembled to the optical module accommodating portion 21 of the housing 20 are pressed and held by the shield case 30.

A plurality of leg portions 33 are formed in a side plate portion 32 of the shield case 30, and the leg portions 33 are inserted into through holes (not shown) of the circuit board and soldered. Accordingly, the optical connector 11 is fixed to the circuit board.

The lens body 40 has a substrate portion 43 formed in a rectangular shape in a plan view, and a light emitting side lens portion 41 and a light receiving side lens portion 42 are formed on the substrate portion 43. The light emitting side lens portion 41 and the light receiving side lens portion 42 are provided side by side. The lens body 40 is integrally molded of a transparent resin having light guiding properties, and the light emitting side lens portion 41 and the light receiving side lens portion 42 are formed on a front surface of the substrate portion 43. In the lens body 40, engagement arms 46 are formed on both sides of the substrate portion 43.

The FOT 60 is formed in a rectangular shape in a plan view, and a light emitting side FOT 61 and a light receiving side FOT 62 are provided side by side on a front surface of the FOT 60. The light emitting side FOT 61 includes, for example, a light emitting element 61a such as a light emitting diode (LED) or a vertical cavity surface emitting laser (VCSEL). The light receiving side FOT 62 includes, for example, a light receiving element 62a such as a photo diode (PD), The MT 60 is integrally molded of a synthetic resin, and the light emitting side FOT 61 and the light receiving side FOT 62 are integrally provided. A plurality of lead frames 65 are provided under the FOT 60. The lead frames 65 are disposed on a pad of the circuit board and soldered, and are electrically connected to a predetermined circuit of the circuit board. An engagement projection 66 is formed on the FOT 60.

The FOT 60 is assembled to a rear surface side of the lens body 40. At this time, in the lens body 40, the engagement arm 46 engages the engagement projection 66 of the FOT 60. That is, the engagement arm 46 of the lens body 40 engages with the engagement projection 66 of the FOT 60, and the lens body 40 and the FOT 60 are assembled in advance to form an integrated optical module. The assembled optical module of the lens body 40 and the FOT 60 is fitted into the optical module accommodating portion 21 of the housing 20 from a lens body 40 side and is accommodated in a state of being positioned at a predetermined position.

Figure 4A:
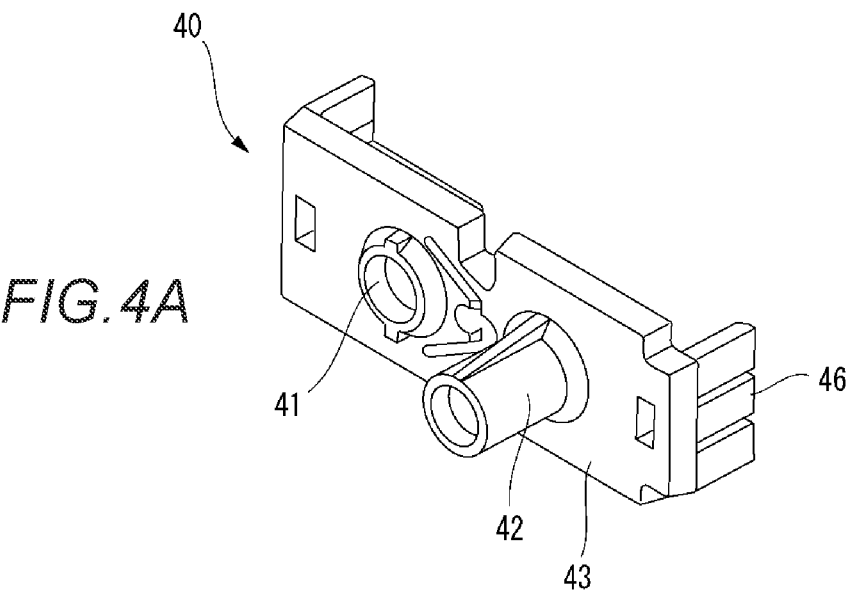
FIGS. 4A and 4B are views showing a lens body.
Figure 4B:
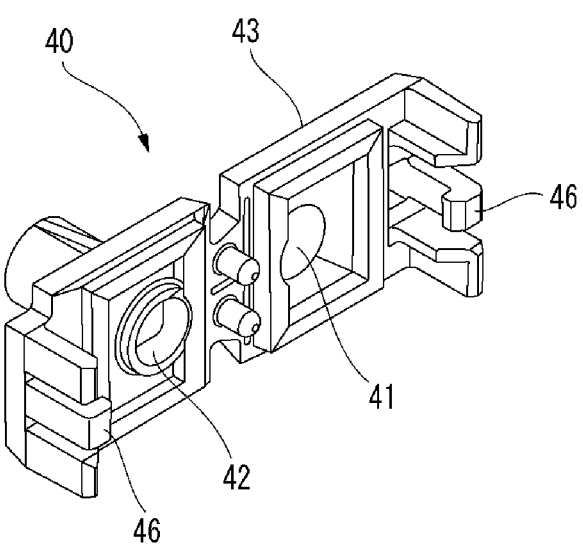
Figure 5:
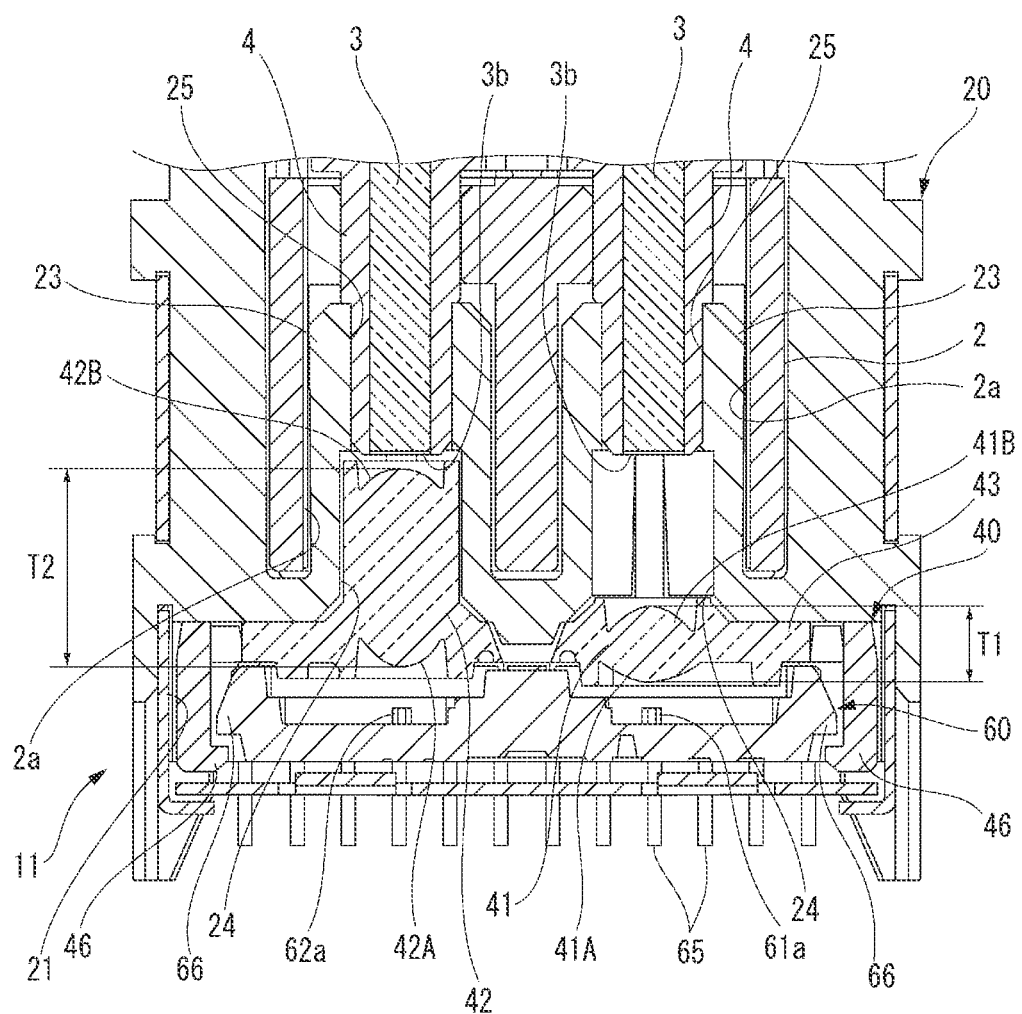
FIG. 5 is a sectional view along an optical axis of the optical connector to which the counterpart optical connector is joined.

FIGS. 4A and 4B are views showing the lens body 40. FIG. 4A is a perspective view from a front side. FIG. 4B is a perspective view from a rear side. FIG. 5 is a sectional view along an optical axis of the optical connector 11 according to the present embodiment to which the counterpart optical connector 1 is joined.

As shown in FIGS. 4A and 4B, the light emitting side lens portion 41 and the light receiving side lens portion 42 of the lens body 40 protrude from the substrate portion 43 with different protruding dimensions. Specifically, the protruding dimension of the light receiving side lens portion 42 from the substrate portion 43 is larger than that of the light emitting side lens portion 41.

As shown in FIG. 5, the light emitting side lens portion 41 has a FOT side lens surface 41A and a fiber side lens surface 41B. The light receiving side lens portion 42 has a FOT side lens surface 42A and a fiber side lens surface 42B. In the lens body 40, the light emitting side FOT 61 of the FOT 60 is disposed at a position facing the FOT side lens surface 41A of the light emitting side lens portion 41, and the light receiving side FOT 62 of the FOT 60 is disposed at a position facing the FOT side lens surface 42A of the light receiving side lens portion 42.

The light emitting side lens portion 41 has a lens thickness T1 between a top of the FOT side lens surface 41A and a top of the fiber side lens surface 41B. The light receiving side lens portion 42 has a lens thickness T2 between a top of the FOT side lens surface 42A and a top of the fiber side lens surface 42B. The lens thickness T2 of the light receiving side lens portion 42 having a larger protruding dimension from the substrate portion 43 than the light emitting side lens portion 41 is larger than the lens thickness T1 of the light emitting side lens portion 41.

A cylindrical ferrule fitting portion 23 protruding into the fitting recess 22 is formed in the housing 20. Lens insertion holes 24 and ferrule insertion holes 25 are formed in this order from a mounting side of the lens body 40 at a center of the ferrule fitting portion 23.

The light emitting side lens portion 41 and the light receiving side lens portion 42 of the lens body 40 are fitted into the lens insertion holes 24 of the ferrule fitting portion 23 of the housing 20, and are positioned in the housing 20.

When the fitting portion 2 of the counterpart optical connector 1 is fitted into the fitting recess 22 of the housing 20 of the optical connector 11 and the optical connector 11 and the counterpart optical connector 1 are joined, the ferrule fitting portion 23 is fitted into a fitting hole portion 2a formed in the fitting portion 2. Then, an end portion of the ferrule 4 of the counterpart optical connector 1 is inserted into the ferrule insertion hole 25 of the ferrule fitting portion 23, a first end surface 3b of a first optical fiber 3 is disposed at a position facing the fiber side lens surface 41B of the light emitting side lens portion 41, and a second end surface 3b of a second optical fiber 3 is disposed at a position facing the fiber side lens surface 42B of the light receiving side lens portion 42.

In the optical connector 11 of the present embodiment, in a state of joining with the counterpart optical connector 1, an optical signal generated by being converted from an electric signal at the light emitting side FOT 61 of the FOT 60 is incident on the light emitting side lens portion 41 from the FOT side lens surface 41A. The optical signal incident on the light emitting side lens portion 41 is emitted from the fiber side lens surface 41B of the light emitting side lens portion 41, is incident from the first end surface 3b of the first optical fiber 3 in the counterpart optical connector 1, and guided to the optical fiber 3 for optical transmission. The optical signal emitted from the second end surface 3b of the second optical fiber 3 in the counterpart optical connector 1 is incident on the light receiving side lens portion 42 from the fiber side lens surface 42B. The optical signal incident on the light receiving side lens portion 42 is emitted from the FOT side lens surface 42A of the light receiving side lens portion 42, and is received by the light receiving side FOT 62 of the FOT 60 and converted into an electric signal.

Figure 6:
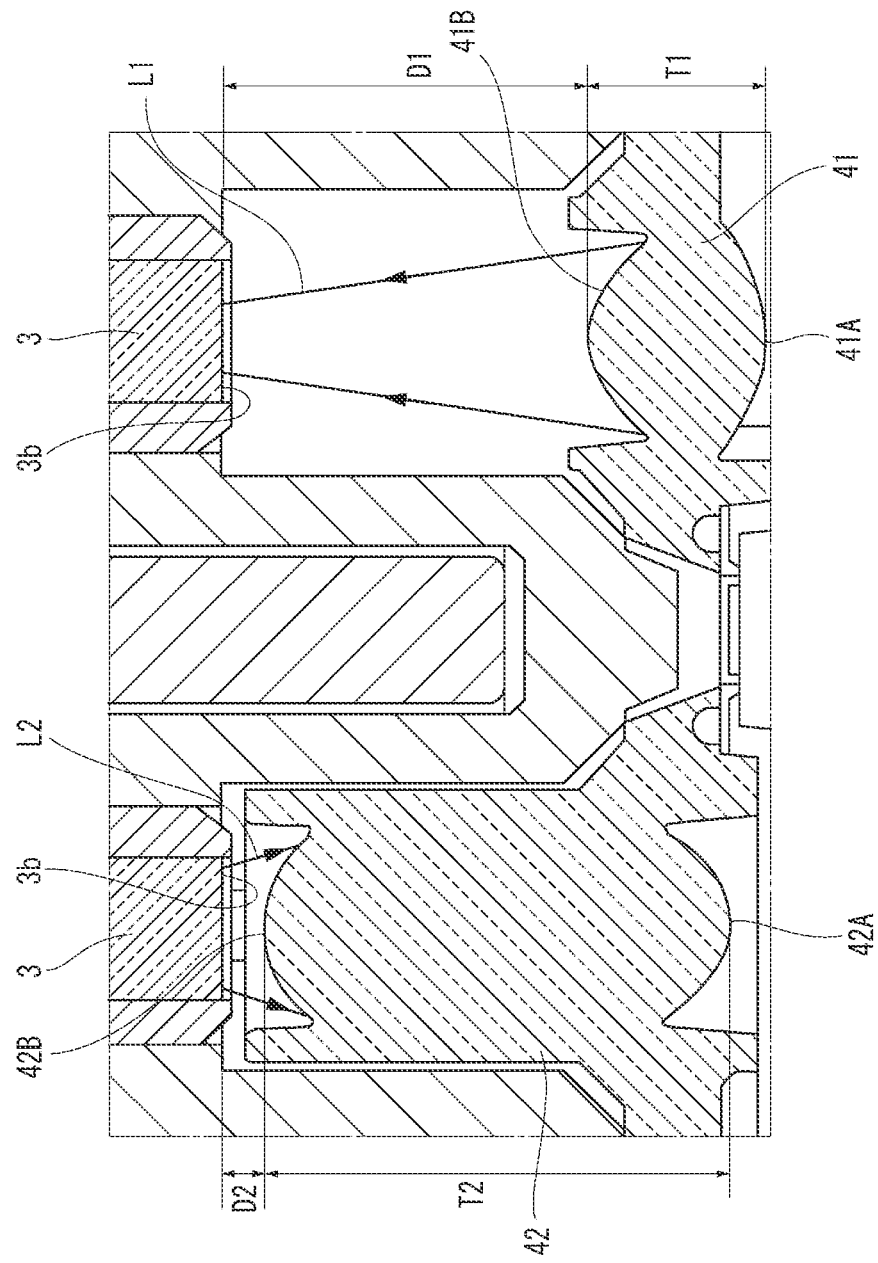
FIG. 6 is a partial sectional view along the optical axis of the optical connector to which the counterpart optical connector is joined.

FIG. 6 is a partial sectional view along the optical axis of the optical connector 11 according to the present embodiment to which the counterpart optical connector 1 is joined.

As shown in FIG. 6, the optical connector 11 according to the present embodiment includes the lens body 40 having the lens thickness T2 of the light receiving side lens portion 42 larger than the lens thickness T1 of the light emitting side lens portion 41. In the optical connector 11 including the lens body 40, in a state that the fitting portion 2 of the counterpart optical connector 1 is fitted in the fitting recess 22 of the housing 20, a distance D2 between the light receiving side lens portion 42 and the end surface 3b of the optical fiber 3 is smaller than a distance D1 between the light emitting side lens portion 41 and the end surface 3b of the optical fiber 3.

Thus, since the distance D2 is made small between the fiber side lens surface 42B of the light receiving side lens portion 42 and the end surface 3b of the optical fiber 3, light L2 emitted from the end surface 3b of the optical fiber 3 and spreading can be efficiently incident on the fiber side lens surface 42B of the light receiving side lens portion 42.

Since the distance D1 is made large between the fiber side lens surface 41B of the light emitting side lens portion 41 and the end surface 3b of the optical fiber 3, light L1 emitted from the fiber side lens surface 41B of the light emitting side lens portion 41 can be reasonably refracted and focused on the end surface 3b of the optical fiber 3.

Here, a reference example will be described.

Figure 7:
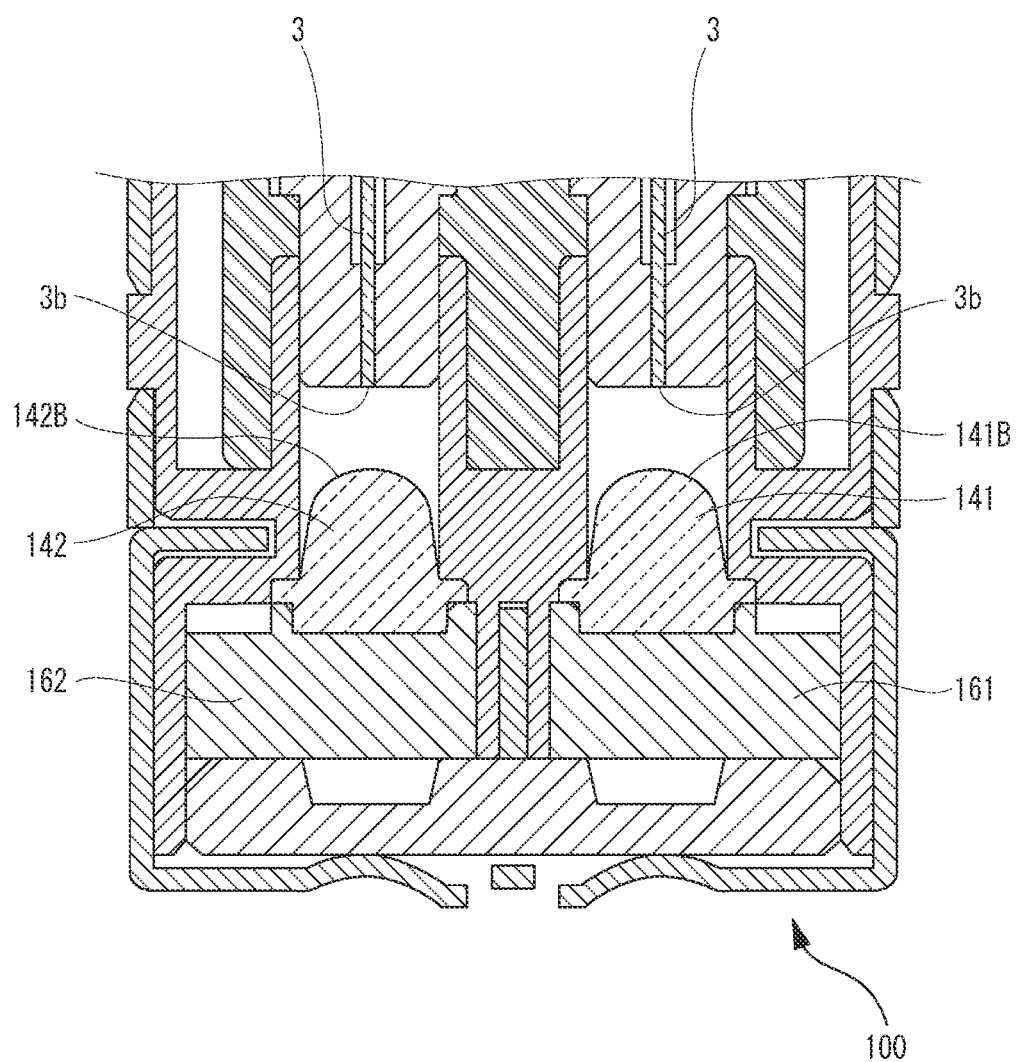
FIG. 7 is a partial sectional view along an optical axis of an optical connector according to a reference example to which the counterpart optical connector is joined.

FIG. 7 is a partial sectional view along an optical axis of an optical connector 100 according to a reference example to which the counterpart optical connector is joined.

As shown in FIG. 7, in the optical connector 100 according to the reference example, a light emitting side lens portion 141 and a light receiving side lens portion 142 have the same lens thickness. A distance between the light emitting side lens portion 141 and the end surface 3b of the optical fiber 3 and a distance between the light receiving side lens portion 142 and the end surface 3b of the optical fiber 3 are the same.

In the optical connector 100 according to the reference example, between the light receiving side lens portion 142 and the optical fiber 3, light emitted from the end surface 3b of the optical fiber 3 and spreading may not be completely received by the light receiving side lens portion 142. Between the light emitting side lens portion 141 and the optical fiber 3, it is necessary to cause the light to be largely refracted and focused over a short distance. Therefore, it may be difficult to efficiently perform the optical transmission due to light loss between both the light emitting side lens portion 141 and the optical fiber 3 and the light receiving side lens portion 142 and the optical fiber 3.

In contrast, according to the optical connector 11 and the optical connector device 10 including the optical connector 11 according to the present embodiment, in the state that the fitting portion 2 of the counterpart optical connector 1 is fitted in the fitting recess 22 of the housing 20, the distance D2 between the light receiving side lens portion 42 and the end surface 3b of the optical fiber 3 is smaller than the distance D1 between the light emitting side lens portion 41 and the end surface 3b of the optical fiber 3.

Accordingly, between the light receiving side lens portion 42 and the end surface 3h of the optical fiber 3, the light L2 emitted from the end surface 3b of the optical fiber 3 and spreading can be efficiently incident on the light receiving side lens portion 42. In addition, between the light emitting side lens portion 41 and the end surface 3b of the optical fiber 3, the light L1 emitted from the light emitting side lens portion 41 can be reasonably bent and focused on the end surface 3b of the optical fiber 3.

Therefore, it is possible to efficiently perform the optical communication while minimizing the light loss between the light emitting side lens portion 41 and the light receiving side lens portion 42 and the end surface 3b of each optical fiber 3 of the counterpart optical connector 1.

According to the optical connector 11 in the present embodiment, the lens thickness T2 of the light receiving side lens portion 42 is larger than the lens thickness T1 of the light emitting side lens portion 41. Therefore, the distance D2 between the light receiving side lens portion 42 and the end surface 3b of the optical fiber 3 is reasonably made smaller than the distance D1 between the light emitting side lens portion 41 and the end surface 3b of the optical fiber 3. In the light emitting side lens portion 41 having the small lens thickness T1, the distance through which the light is transmitted within the light emitting side lens portion 41 can be reduced, and an attenuation of the light that increases according to a transmittance peculiar to the lens can be reduced.

In the optical connector 11 according to the present embodiment, the light emitting side lens portion 41 and the light receiving side lens portion 42 are integrally molded on the substrate portion 43 to form the lens body 40, and are assembled to the housing 20. Therefore, when the lens body 40 is assembled to the housing 20, the light emitting side lens portion 41 and the light receiving side lens portion 42 having different lens thicknesses T1 and T2 are easily positioned and accommodated in the housing 20.

The present invention is not limited to the above-described embodiment, and may be appropriately modified, improved, or the like. In addition, materials, shapes, sizes, numbers, arrangement places and the like of elements in the above-described embodiment are optional and not limited as long as the object of the present invention can be achieved.

For example, in the above embodiment, the lens body 40 in which the light emitting side lens portion 41 and the light receiving side lens portion 42 are integrally formed on the substrate portion 43 is used, but a structure in which separate light emitting side lens portion 41 and light receiving side lens portion 42 are assembled to the housing 20 may be used.

Here, characteristics of the embodiment of the optical connector and the optical connector device according to the present invention described above are briefly summarized in the following [1] to [4].

[1] An optical connector (11) including:
a housing (20) in which a counterpart optical connector (1) connected to a pair of optical fibers (3) having a first optical fiber and a second optical fiber is fitted;
a light emitting side lens portion (41) accommodated in the housing (20), and in which a first end surface (3b) of the first optical fiber (3) in the counterpart optical connector (1) is disposed on one end side;
a light receiving side lens portion (42) accommodated in the housing (20), and in which a second end surface (3b) of the second optical fiber (3) in the counterpart optical connector (1) is disposed on one end side;
a light emitting element (61a) disposed on the other end side of the light emitting side lens portion (41); and
a light receiving element (62a) disposed on the other end side of the light receiving side lens portion (42),
wherein in a state that the counterpart optical connector (1) is fitted to the housing (20), a distance (D2) between the light receiving side lens portion (42) and the second end surface (3b) of the optical fiber (3) is smaller than a distance (D1) between the light emitting side lens portion (41) and the first end surface (3b) of the optical fiber (3).

[2] The optical connector (11) according to [1],
wherein a second lens thickness (T2) of the light receiving side lens portion (42) is larger than a first lens thickness (T1) of the light emitting side lens portion (41).

[3] The optical connector (11) according to [1] or [2],
wherein the light emitting side lens portion (41) and the light receiving side lens portion (42) are integrally molded on a substrate portion (43) to form a lens body (40), and are assembled to the housing (20).

[4] An optical connector device (10) including:
the counterpart optical connector (1); and
the optical connector (11) according to any one of [1] to [3].

According to the aspect [1], in the state that the counterpart optical connector is fitted to the housing, the distance between the light receiving side lens portion and the end surface of the optical fiber is smaller than the distance between the light emitting side lens portion and the end surface of the optical fiber.

Accordingly, between the light receiving side lens portion and the end surface of the optical fiber, light emitted from the end surface of the optical fiber and spreading can be efficiently incident on the light receiving side lens portion. In addition, between the light emitting side lens portion and the end surface of the optical fiber, light emitted from the light emitting side lens portion can be reasonably bent and focused on the end surface of the optical fiber.

Therefore, it is possible to efficiently perform optical communication while minimizing light loss between each lens portion on a light emitting side and a light receiving side and the end surface of each optical fiber of the counterpart optical connector.

According to the aspect [2], the second lens thickness of the light receiving side lens portion is larger than the first lens thickness of the light emitting side lens portion. Therefore, by matching a position on a light emitting element side in the light emitting side lens portion and a position on a light receiving element side in the light receiving side lens portion, the distance between the light receiving side lens portion and the end surface of the optical fiber is reasonably made smaller than the distance between the light emitting side lens portion and the end surface of the optical fiber. In the light emitting side lens portion having a small lens thickness, a distance through which light is transmitted within the light emitting side lens portion can be reduced, and an attenuation of the light that increases according to a transmittance peculiar to the lens can be reduced.

According to the aspect [3], since the lens body is assembled to the housing, the light emitting side lens portion and the light receiving side lens portion having different lens thicknesses are easily positioned and accommodated in the housing.

According to the aspect [4], when the counterpart optical connector is fitted to the housing, the distance between the light receiving side lens portion and the end surface of the optical fiber is smaller than the distance between the light emitting side lens portion and the end surface of the optical fiber.

Accordingly, between the light receiving side lens portion and the end surface of the optical fiber, light emitted from the end surface of the optical fiber and spreading can be efficiently incident on the light receiving side lens portion. In addition, between the light emitting side lens portion and the end surface of the optical fiber, the light emitted from the light emitting side lens portion can be reasonably focused on the end surface of the optical fiber.

Therefore, according to the optical connector device configured as described above, it is possible to favorably perform the optical communication while minimizing the light loss between each lens portion on the light emitting side and the light receiving side and the optical fiber of the counterpart optical connector.

According to one or more embodiments, it is possible to provide an optical connector and an optical connector device capable of efficiently performing optical communication while preventing light loss between optical fibers.

What is claimed is:

1. An optical connector comprising:
    a housing in which a counterpart optical connector connected to a pair of optical fibers having a first optical fiber and a second optical fiber is fitted;
    a light emitting side lens portion accommodated in the housing, and in which a first end surface of the first optical fiber in the counterpart optical connector is disposed on one end side;
    a light receiving side lens portion accommodated in the housing, and in which a second end surface of the second optical fiber in the counterpart optical connector is disposed on one end side;
    a light emitting element disposed on the other end side of the light emitting side lens portion; and
    a light receiving element disposed on the other end side of the light receiving side lens portion,
    wherein in a state that the counterpart optical connector is fitted to the housing, a distance between the light receiving side lens portion and the second end surface of the second optical fiber is smaller than a distance between the light emitting side lens portion and the first end surface of the first optical fiber,
    the light receiving side lens portion has a FOT side lens surface that faces the light receiving element and a fiber side lens surface that faces the second optical fiber,
    the light emitting side lens portion has a FOT side lens surface that faces the light emitting element and a fiber side lens surface that faces the first optical fiber,
    a thickness of the light emitting side lens portion measured from the FOT side lens surface of the light emitting side lens portion to the fiber side lens surface of the light emitting side lens portion is less than a thickness of the light receiving side lens portion measured from the FOT side lens surface of the light receiving side lens portion to the fiber side lens surface of the light receiving side lens portion.

2. The optical connector according to claim 1,
    wherein the light emitting side lens portion and the light receiving side lens portion are integrally molded on a substrate portion to form a lens body, and are assembled to the housing.

3. An optical connector device comprising:
    the counterpart optical connector; and
    the optical connector according to claim 1.

4. The optical connector according to claim 1,
    wherein a distance between the second end surface of the second optical fiber and the FOT side lens surface of the light receiving side lens is less than a distance between the first end surface of the first optical fiber and the FOT side lens surface of the light emitting side lens.

* * * * *